(12) United States Patent
Ringdalen et al.

(10) Patent No.: US 11,352,096 B2
(45) Date of Patent: Jun. 7, 2022

(54) FOLDABLE BICYCLE TRAILER

(71) Applicant: THOR HUSHOVD AS, Høvik (NO)

(72) Inventors: Martin Gudem Ringdalen, Trondheim (NO); Lars Standal Strømmegjerde, Ranheim (NO)

(73) Assignee: THOR HUSHOVD AS, Høvik (NO)

( * ) Notice: Subject to any disclaimer, the term of this patent is extended or adjusted under 35 U.S.C. 154(b) by 0 days.

(21) Appl. No.: 17/253,287

(22) PCT Filed: Jul. 12, 2019

(86) PCT No.: PCT/NO2019/050151
§ 371 (c)(1),
(2) Date: Dec. 17, 2020

(87) PCT Pub. No.: WO2020/013709
PCT Pub. Date: Jan. 16, 2020

(65) Prior Publication Data
US 2021/0354779 A1    Nov. 18, 2021

(30) Foreign Application Priority Data
Jul. 13, 2018   (NO) .................................. 20180985

(51) Int. Cl.
*B62B 7/12*       (2006.01)
*B62K 27/02*      (2006.01)
(Continued)

(52) U.S. Cl.
CPC ............ *B62K 27/003* (2013.01); *B62B 7/126* (2013.01); *B62K 27/02* (2013.01); *B62K 27/12* (2013.01); *B62K 27/08* (2013.01)

(58) Field of Classification Search
CPC ...... B62K 27/003; B62K 27/02; B62K 27/08; B62K 27/12; B62B 7/126; B62B 2205/02; B62B 7/06
(Continued)

(56) References Cited

U.S. PATENT DOCUMENTS 5,669,618 A  *  9/1997  Chiu ...................... B62K 27/12
                                                     280/204
5,687,980 A     11/1997  Eckroth
(Continued)

FOREIGN PATENT DOCUMENTS

CN        1080899 A     1/1994
CN        2551563 Y     5/2003
(Continued)

OTHER PUBLICATIONS

Mortensen, Tatiana P.; International Search Report; PCT/NO2019/050151; dated Sep. 24, 2019; 3 pages.
(Continued)

*Primary Examiner* — Kevin Hurley
*Assistant Examiner* — Hosam Shabara
(74) *Attorney, Agent, or Firm* — Shackelford, Bowen, McKinley & Norton, LLP

(57) ABSTRACT

A foldable bicycle trailer has at least two main frames (1,2) disposed symmetrically about a central plane. These are connected by crossbars. The frames (1,2) stand on wheels (21,22) or on any other movable interface on its either side. The crossbars comprise a first element which is substantially flat in unfolded state, having at least two parallel foldable arms (9a, 10a) and a second element which is substantially upright in unfolded stage, also having at least two parallel foldable arms (11a, 12a). The foldable arms (9a, 10a, 11a,
(Continued)

12a) of each of first and second elements are connected by hinges (5, 6, 7,8) for connecting the foldable segments of each foldable arm.

16 Claims, 18 Drawing Sheets

(51) Int. Cl.
*B62K 27/12* (2006.01)
*B62K 27/08* (2006.01)
*B62K 27/00* (2006.01)

(58) Field of Classification Search
USPC .......................................................... 280/204
See application file for complete search history.

(56) References Cited

U.S. PATENT DOCUMENTS

| | | | |
|---|---|---|---|
| 5,785,333 A | 7/1998 | Hinkston et al. | |
| 6,705,628 B2* | 3/2004 | Kahmann | B62B 7/06 |
| | | | 280/204 |
| 7,168,761 B2 | 1/2007 | Britton et al. | |
| 7,354,058 B2* | 4/2008 | Chou | B62D 63/061 |
| | | | 280/651 |
| 7,387,310 B1* | 6/2008 | Liu | B62B 7/10 |
| | | | 280/47.38 |
| 8,444,173 B1* | 5/2013 | Liu | B62K 27/003 |
| | | | 280/656 |
| 8,936,269 B1* | 1/2015 | Liu | B62K 27/003 |
| | | | 280/656 |
| 8,967,651 B1* | 3/2015 | Simic | B62K 27/02 |
| | | | 280/204 |
| 9,908,552 B2* | 3/2018 | Fleming | B62B 7/10 |
| 2002/0074764 A1 | 6/2002 | Allen et al. | |
| 2002/0096857 A1* | 7/2002 | Valdez | B62B 7/126 |
| | | | 280/293 |
| 2007/0284842 A1 | 12/2007 | O'Donnell | |
| 2020/0324853 A1* | 10/2020 | Liu | B62K 27/12 |

FOREIGN PATENT DOCUMENTS

| | | | | |
|---|---|---|---|---|
| CN | 201400211 Y | | 2/2010 | |
| CN | 103434555 A | | 12/2013 | |
| CN | 106741087 A | * | 5/2017 | |
| DE | 29716106 U1 | | 11/1997 | |
| JP | 2941174 B2 | * | 8/1999 | ............ B62K 27/02 |
| WO | WO-0189907 A1 | | 11/2001 | |
| WO | WO-02060748 A1 | | 8/2002 | |

OTHER PUBLICATIONS

Mortensen, Tatiana P., International Preliminary Report on Patentability and Demand for PCT Chapter II; PCT/NO2019/050151; dated Sep. 14, 2020; 8 pages.

* cited by examiner

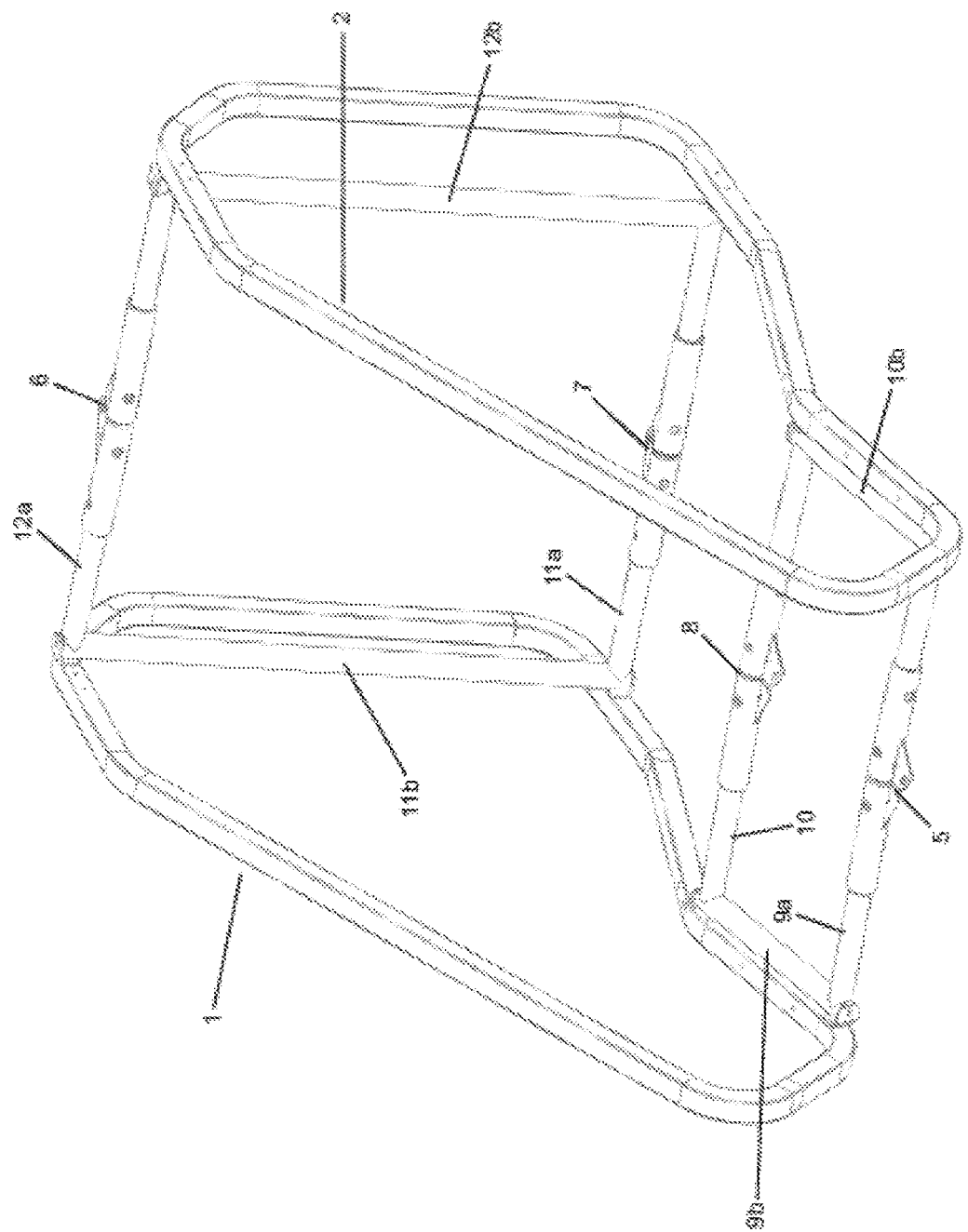

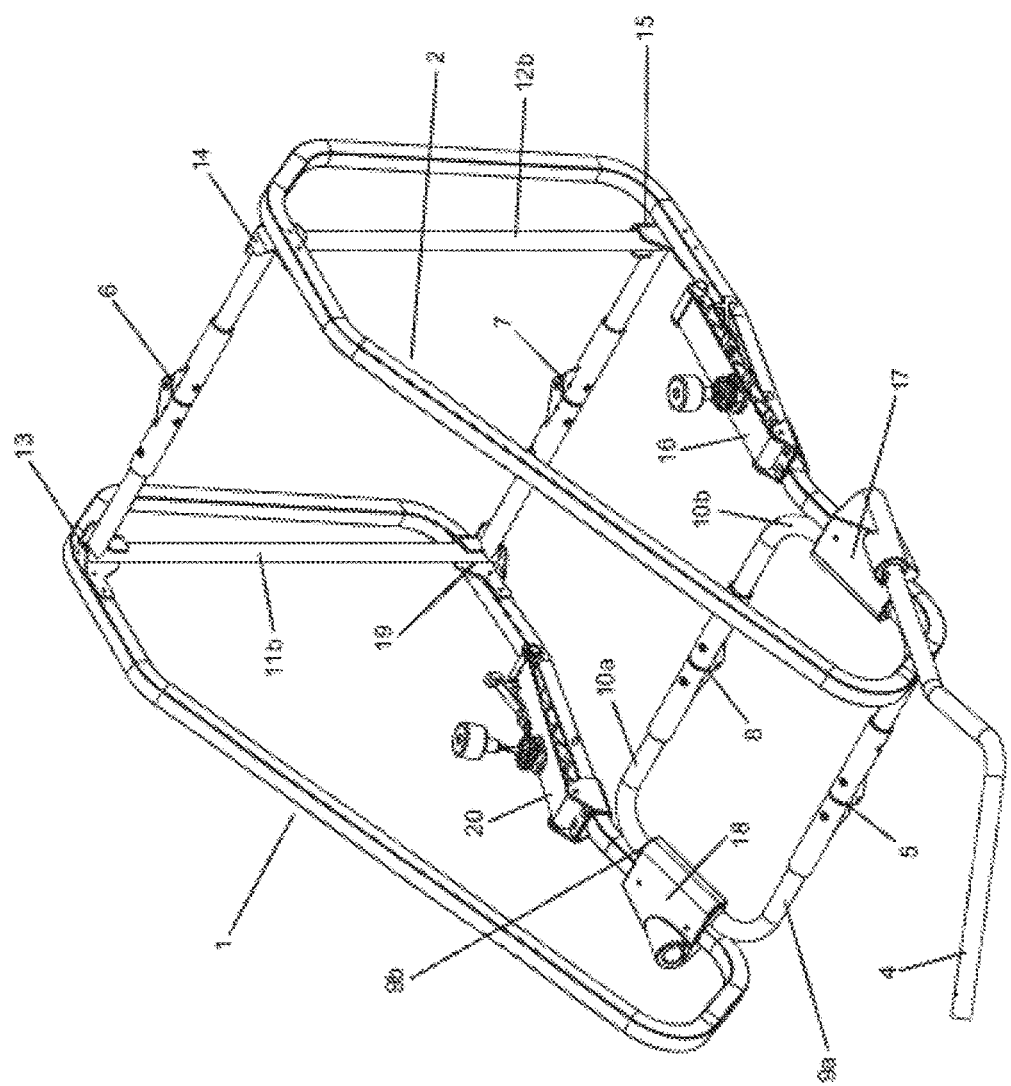

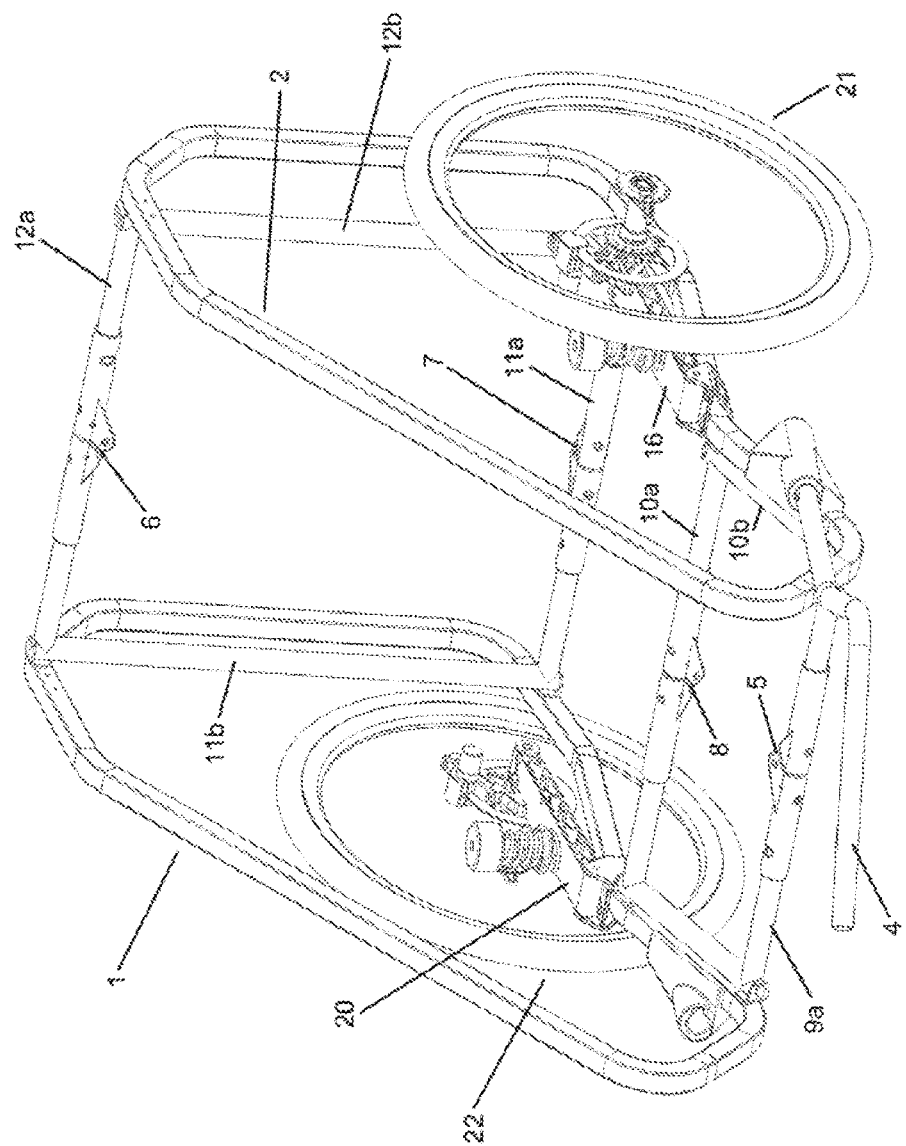

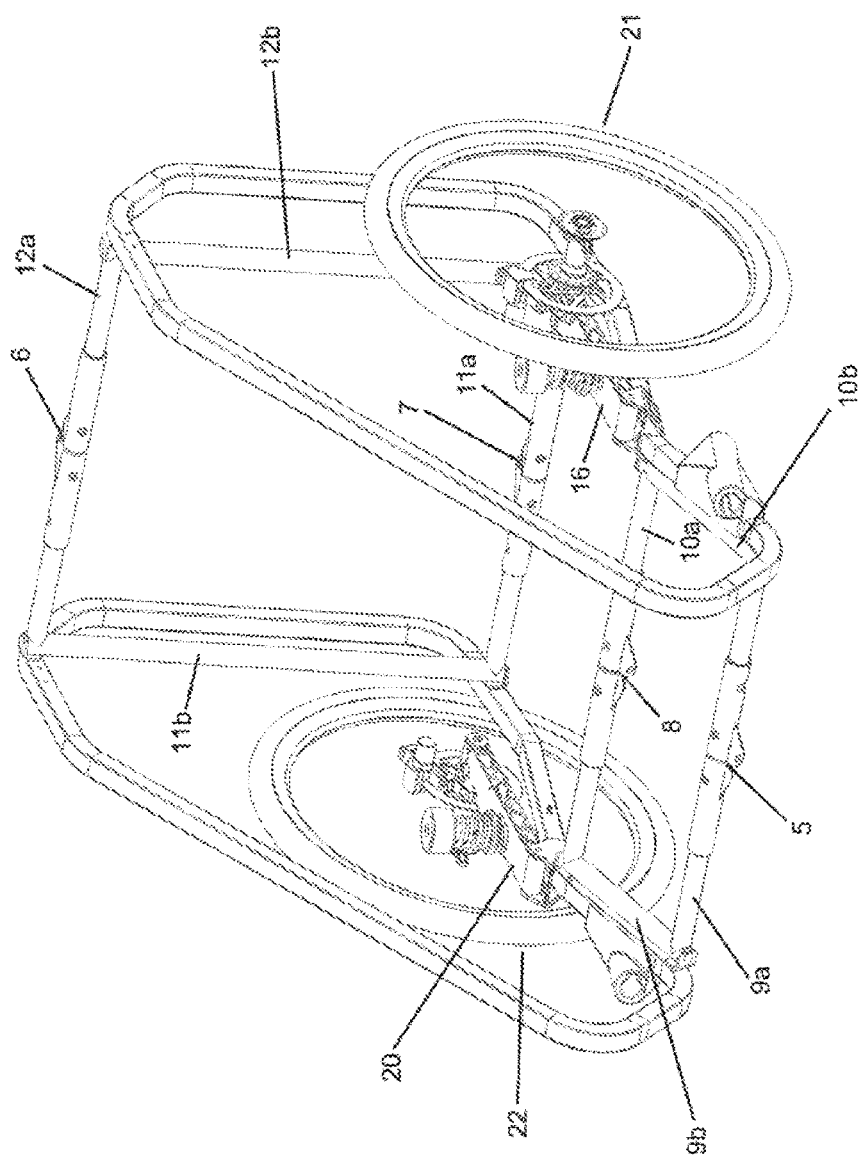

FOLDABLE BICYCLE TRAILER

TECHNICAL FIELD

The present invention in general, relates to a bicycle trailer, which can also be used as a baby buggy or for carrying goods.

Particularly, the present invention relates to a foldable bicycle trailer for carrying children or for carrying goods. This foldable bicycle trailer also finds use as a baby buggy and as a carrier for goods, without being towed by a bicycle.

More particularly, the present invention relates to a bicycle trailer according to the preamble of claim 1.

BACKGROUND ART

Foldable chairs on wheels are already known, for being used as a bicycle trailer, which carries children safely. It is also known, that such foldable chairs can also be used as baby buggy which is pushed from behind, rather than being towed by a bicycle. These chairs on wheels, whether being towed by a bicycle or being pushed from behind, are also known to be used for carrying goods.

Now, one common problem, encountered in folding these foldable chairs (hereinafter referred to as bicycle trailer, without any limitation and it should be understood that the present invention embraces all the types of foldable chairs, as stated in the preceding paragraph) on wheels, is to keep the wheels at the base in its original position, while folding the chair laterally, so that a reduced footprint is achieved. This is primarily needed, to transport the bicycle trailers through doors and store them in a proper place.

International patent application WO 01/89907 A1 describes a bicycle child carrier trailer comprising a bed portion configured to carry a load, wherein the bed portion has a frame assembly supporting a seat portion. The frame assembly comprises front and read portions and opposite side portion, where each of the front and rear portions can be collapsed to substantially reduce the side to side dimensions of the trailer for storage or transport.

Granted U.S. Pat. No. 7,168,761 discloses a child carrier frame which includes a lower frame, an upper frame and a frame support. The frame may be adjusted between an upright position for use, and a folded position. The process of folding and unfolding is a bit complicated due to the complex arrangement of the components. This also true for the bicycle trailer disclosed in US 2002/0074764. It has front and back hub members, which allow the trailer to be vertically collapsed to substantially reduce the Side-to-side dimension of the trailer for storage or transport.

Granted U.S. Pat. No. 5,687,980, discloses a foldable bicycle trailer having a foldable frame. A pair of wheels are permanently mounted in a rotatable manner to the foldable frame. The foldable frame with the wheels can fold up for storage.

The technology covered by this patent does take care to some extent of not changing the position of the wheels, while folding the bicycle trailer. The foldable frame 12 includes a pair of continuous looped side rails 16 and 18. A plurality of collapsible crossbars 20 extend between the side rails 16 and 18.

When the crossbars 20 are collapsed, the side rails 16 and 18 will move towards each other for storage. Each crossbar has two pipes 22. A pair of hinge mounts 24 are provided. Each hinge mount connects a first end 26 of one pipe 22 to one side rail 16 or 18. A latch lock 28 is attached between the abutting second ends 30 of the pipes 22.

In the above patent, the latch locks 28 must manually opened or closed before the trailer can be folded and unfolded respectively and the geometry of the crossbars result into unfortunate loads on these cross bars during the folding and unfolding actions.

The present invention proposes to provide simpler foldable bicycle trailer, which does away with the above problem. This is achieved by providing a foldable bicycle trailer, which has a simple geometry of cross bars, and has elements that can be folded or unfolded without undue load on these elements during folding/unfolding operations.

SUMMARY OF INVENTION

Accordingly, the present invention provides a foldable bicycle trailer having at least two main frames are disposed symmetrically about a central plane. The frames connected by crossbars and stand on wheels or other movable interface on its either side. The crossbars comprise a first element which is substantially flat in unfolded state, having at least two parallel foldable arms and a second element which is substantially upright in unfolded stage, also having at least two parallel foldable arms. The foldable segments of the foldable arms of each of first and second elements are connected by hinges.

It is possible that the interface can accommodate plurality of wheels on either side of the main frames. It is also possible that interface is adapted to hold larger fastened jogger wheels or attachment of harness/straps for using the trailer as a sleigh/pulk where the wheel area is replaced by skies.

Preferably, each of the first element and second element comprise a board with a piano-hinge along the middle part.

More preferably each of the first and second element comprise a U-shaped element, each corner of the U-shaped elements is pivotally fastened to the main frames and the hinges connecting the foldable segments of the foldable arms, are positioned at the central part of each of the respective foldable arms.

Even more preferably, the first and second elements are connected by hinges and at least one of the connecting hinges between the elements are lockable.

Else, the foldable segments of the foldable arms are connected by lockable hinges which can be locked and unlocked manually or remotely.

BRIEF DESCRIPTION OF DRAWINGS

Having described the main features of the invention above, a more detailed and non-limiting description of a preferred embodiment will be given in the following with reference to the drawings.

FIG. 1a is a perspective view of the frame of the bicycle trailer showing the foldable crossbars without the wheels in an unfolded stage.

FIG. 1b is the same perspective view as in FIG. 1a with the connectivities between the components in detail.

FIG. 8a is a perspective view which is identical to FIG. 7, but here the wheels are shown in place. It also shows the tow bar for towing the trailer.

FIG. 13 is the final unfolded stage. Here, the wheels are also shown, and two of the lockable hinges are in unlocked state.

DETAILED DESCRIPTION OF THE INVENTION

Figure 1C:
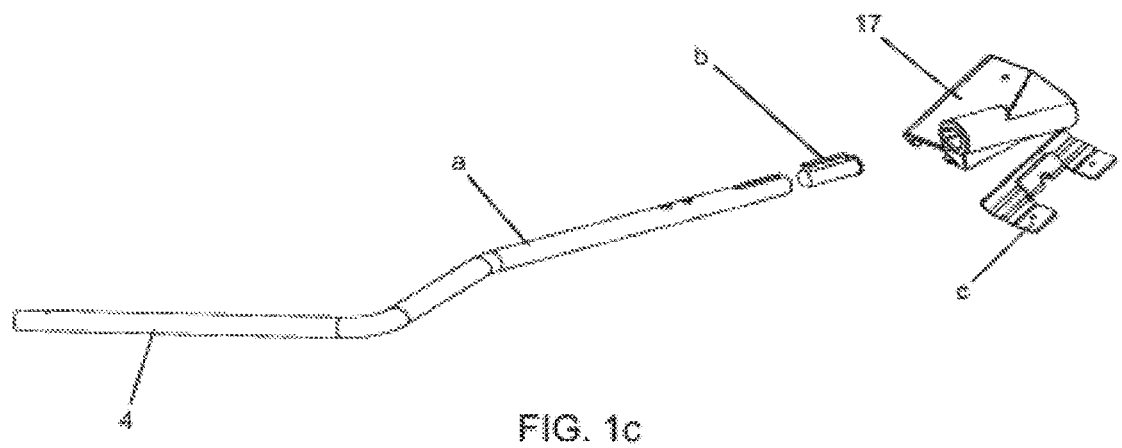
FIG. 1c is an enlarged view of the lower left-hand side of the frame shown in FIG. 1b, illustrating the tow bar, bike arm and attachment brackets.

The following describes a preferred embodiment of the present invention which are purely exemplary for the sake of understanding the invention and non-limiting.

When in the following it is referred to "above" or "below" and "top/upper" and "bottom/lower", "right hand/left hand" and similar terms, this is strictly referring to the orientation as shown in the drawings, where the top portion of the drawings indicate "top".

It should also be understood that the number of components may be different from what is shown in the drawings without deviating from the principle of the invention.

In all the figures, like reference numerals represent like features.

To understand the structure of the bicycle trailer according to the present invention, first the FIGS. 1a, 8a, 8b and 13 should be referred to.

Figure 8B:
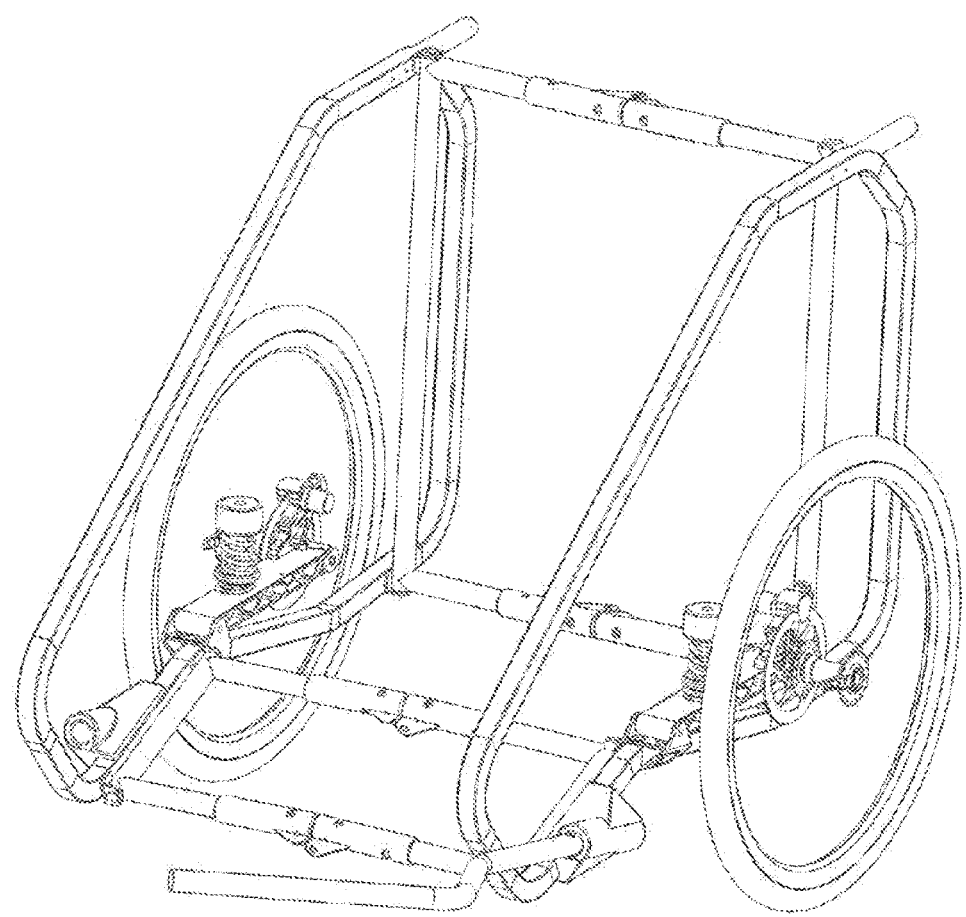
FIG. 8b-8d are perspective views of the one shown in FIG. 8a, also showing the detachable handle the for pushing the trailer from behind.

FIG. 1a is a view of the frames only in unfolded stage. FIGS. 8a, 8b are views of the frames, wheels and other features in unfolded stage, while FIG. 13 is a view of the frames on the wheels.

Referring to FIG. 1a, the bicycle trailer has at least two parallel main frames 1, 2 which are connected by crossbars. As shown in FIGS. 8a, 8b and 13 the frames 1, 2 rest rotatable on a pair of wheels 21,22 on either side of it. This is according to the preferred embodiment illustrated. According to another preferred embodiment (not shown), the main frames 1, 2 may not be parallel, but always these two frames should be symmetrically disposed about a central plane.

The crossbars comprise a first U-shaped element which is substantially flat in unfolded state, having at least two parallel foldable arms 9a, 10a. There is a second U-shaped element which is substantially upright in unfolded stage, also having at least two parallel foldable arms 11a, 12a. It is also within the scope of the present invention that each of the first and second element may comprise a board with a piano hinge along the middle part.

The foldable segments of the foldable arms 9a, 10a, 11a, 12a of each U-shaped element are connected by hinges 5, 6, 7,8. The foldable arms of 9a, 10a, 11a, 12a of both the U-shaped elements can have the same length so that the main frames 1,2 can move against each other with equal speed. However, this is not essential. According to another preferred embodiment, this length is not same, particularly where, the frames/sidewalls are not parallel. (Not shown).

The U-shaped elements each have a pair of rigid arms 9b, 10b, 11b, 12b near the main frames 1,2. The hinges 5,6,7,8 connecting the foldable segments of the foldable arms are positioned at the central part of each of the respective foldable arms 9a, 10a, 11a, 12a.

Referring to FIGS. 1a and 1b, each corner of both the U-shaped elements are pivotally fastened 13, 14, 15, 19 to the main frames 1, 2. FIGS. 1 and 1b show only the hinge brackets 13, 14, 15, 19 of the second U-shaped element. The U-shaped elements can be turned about 90 degrees upwards and forward, as explained with reference to folding and unfolding process of the bicycle trailer a little later.

The foldable segments of one of the foldable arms 9a, 12a of each U-shaped element are connected by lockable hinges 5, 6 and while the foldable segments of the other foldable arms 10a, 11a of each U-shaped element are connected by unlockable hinges 7, 8. From FIG. 1a it should be clear that there is one lockable hinge 5 and on unlockable hinge 8 for the first U-shaped element and one lockable hinge 6, (upper one) and one unlockable hinge 7 for the second U-shaped element. However, it is not mandatory. All the four hinges can be lockable. These locks can be operated by manual or remote means, for example by a cable/wire. At least one of the connecting hinges between the elements can be lockable.

FIG. 1b also shows the hinge brackets 13, 14, 15 and 19 which pivotally fasten the second U-shaped element with the main frames 1, 2 and the left-hand attachment bracket 17 and the right-hand attachment bracket 18. It is within the scope of the present invention, that extra wheels can be fastened and there can be an adapted interface in the right side, in that respect. In addition, said interface can be used for profiles holding a bit larger fastened jogging wheel or attachment of harness/straps for using the trailer as a sleigh/pulk, when the wheels area is replaced by skies. More generally, the invention incorporates an interface for pulling the trailer with all kind of possible equipment.

FIG. 1b also shows the right-hand suspension 20 and the left-hand suspension 16 for the right-hand wheel 22 and the left-hand wheel 21 respectively. It also shows the tow bar 4 and how it is attached to the lower lateral portion of the trailer.

FIG. 1c elaborates the features of the left-hand attachment bracket 17. It also illustrates the footwell support c the bike arm a with enforcement cap b at its distal end portion. In general, it shows how the tow bar 4 is connected to the left-hand attachment bracket 17. However, it is also possible to connect the tow bar 4 to the right-hand attachment bracket 18. The tow bar 4 serves the purpose of towing by a bicycle.

Figure 1D:
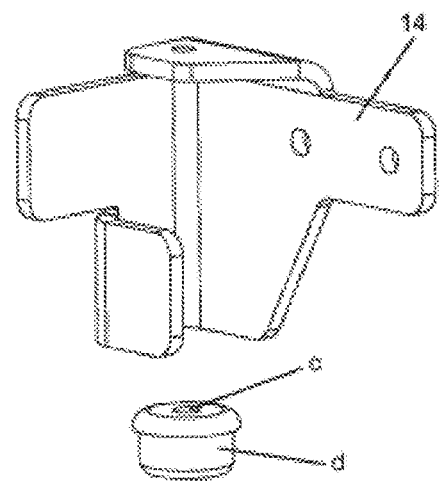
FIG. 1d is an enlarged and exploded view of the upper left-hand side hinge bracket attaching one cross bar arm at the left-hand side corner of the frame.

FIG. 1d is an enlarged and exploded view of the upper left-hand hinge bracket 14. It indicates the hinge functioning by means of which the second U-shaped element is attached to one corner of the frame 2. It illustrates the through hole c and the bushing d. This of course is an example and a preferred feature of the invention.

Referring to FIG. 1a again, the foldable arms 9a, 10a of the first U-shaped element and the foldable arms 11a, 12a of the second U-shaped element are disposed at an angle to each other, whereby, the trailer can be folded and unfolded just by applying force to the upper part of the trailer. This shall be explained a later while explaining the folding and unfolding process.

Figure 8C:
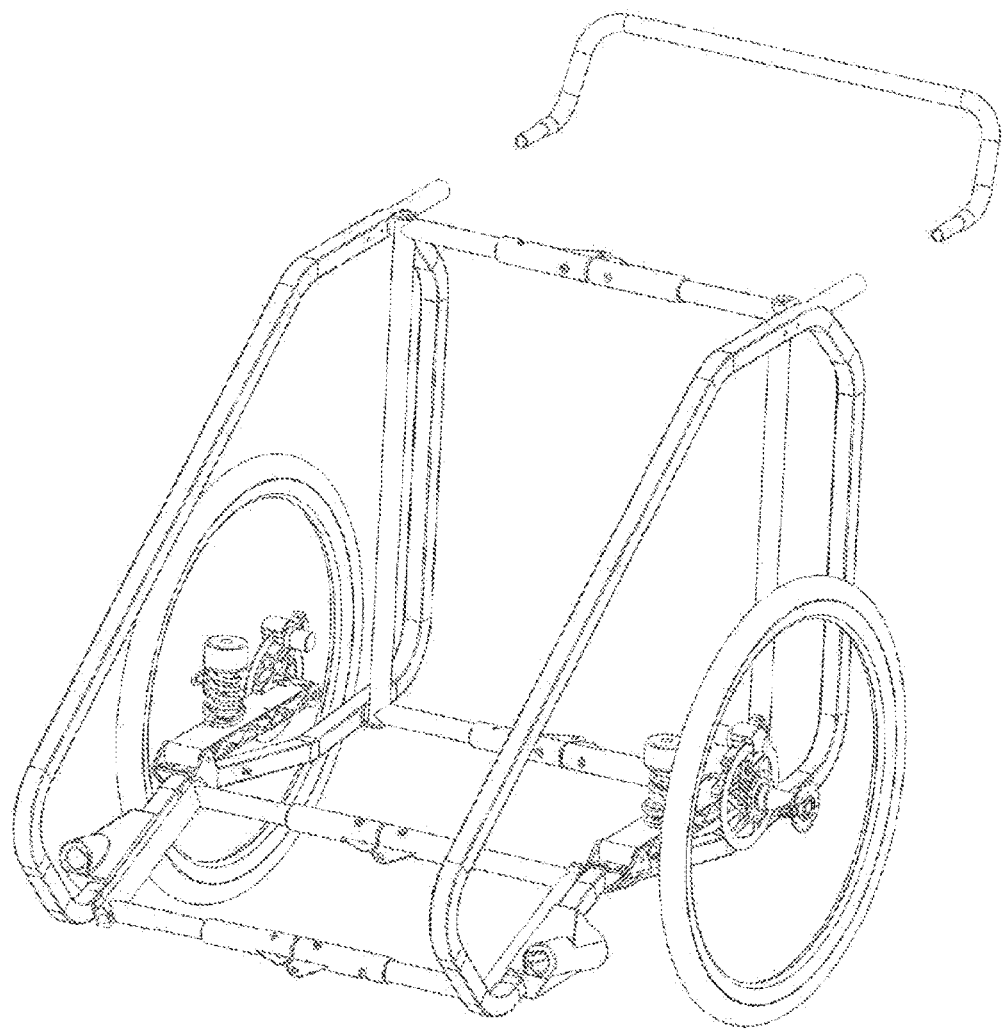
Figure 8D:
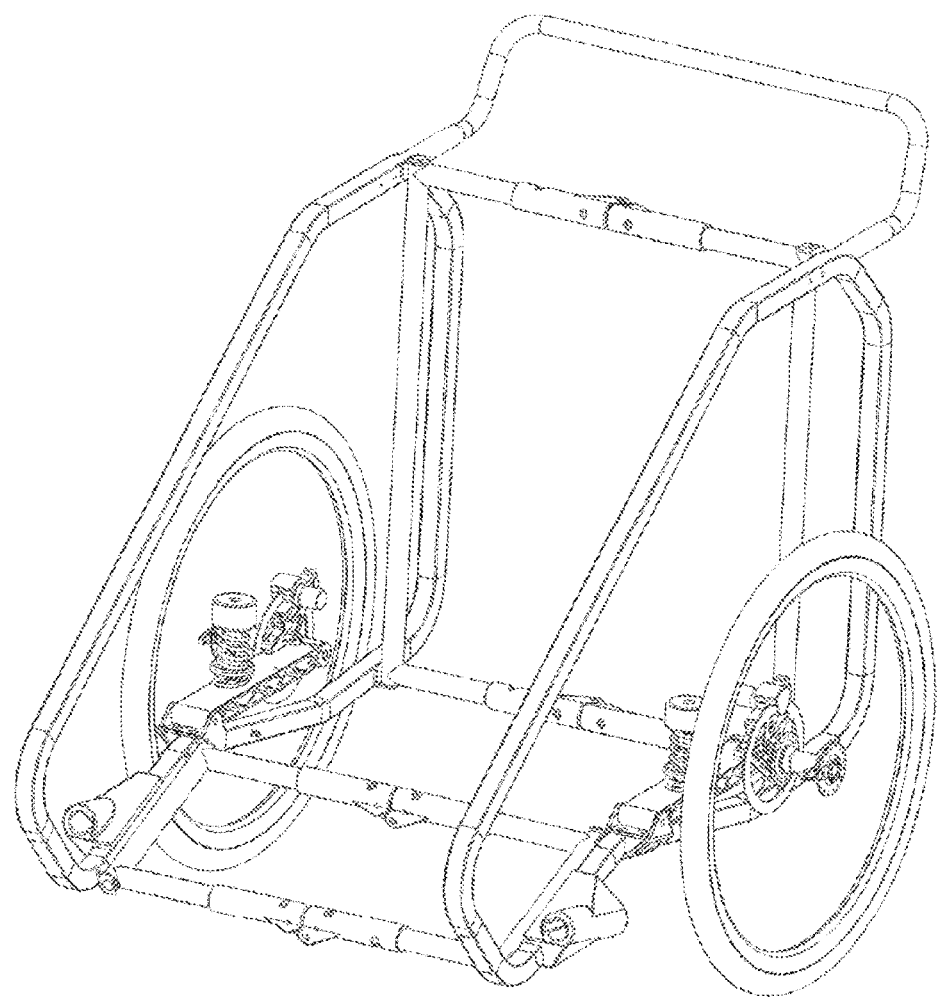

From FIGS. 8b-d it should be clear foldable handles 3 are connected to the rigid arms 11b, 12b of the second U-shaped element. In another embodiment, the handles can be connected to the upper side of the frame, either to the sidewall or said tubes. This enables the trailer to be pushed from behind, rather than being towed, for use as baby buggy or for goods carrier.

A pair of detachable and adjustable seats (not shown) are connected to the main frames structure 1,2, 9a, 10a, 11a, 12a, such that said seats face forward and can accommodate at least two children therein for using the trailer as a baby buggy. The seats are provided with straps (not shown) and protective covering (not shown) for safety of the children. It should be understood that the present invention, embraces seats which are not adjustable as well.

Having explained the structure of the foldable bicycle trailer, now the folding and unfolding process is explained in detail with reference to the FIGS. 1a to 13.

Referring to FIG. 1a, the frames 1, 2 are now unfolded and the hinges 6 and 8 are unlocked. Of course, the hinges 5 and 7, always remain unlocked.

However, as explained before all the four hinges can be lockable. These locks can be operated by manual or remote means, for example by a cable/wire. At least one of the connecting hinges between the elements can be lockable.

Figure 2:
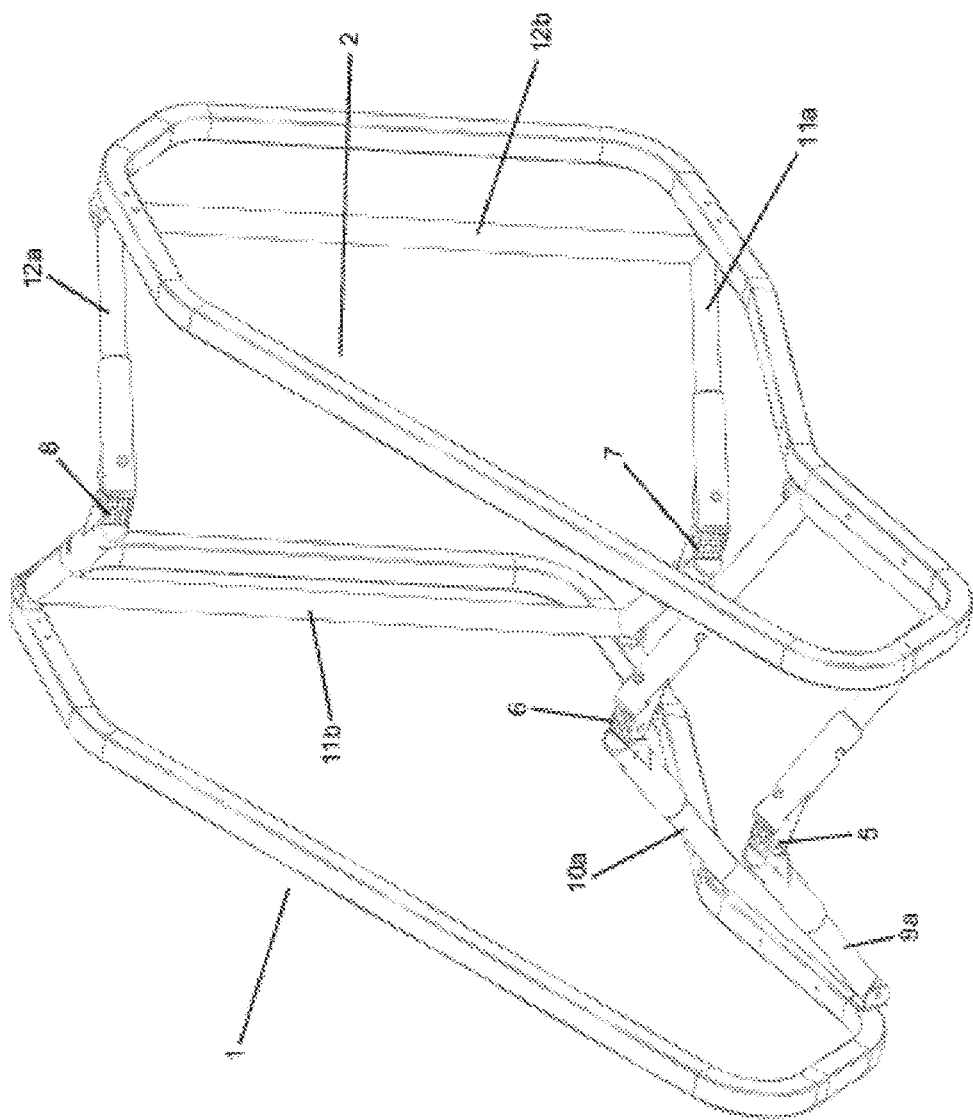
FIG. 2 is a view of a stage when the frame shown in FIG. 1a has started to fold.
Figure 9:
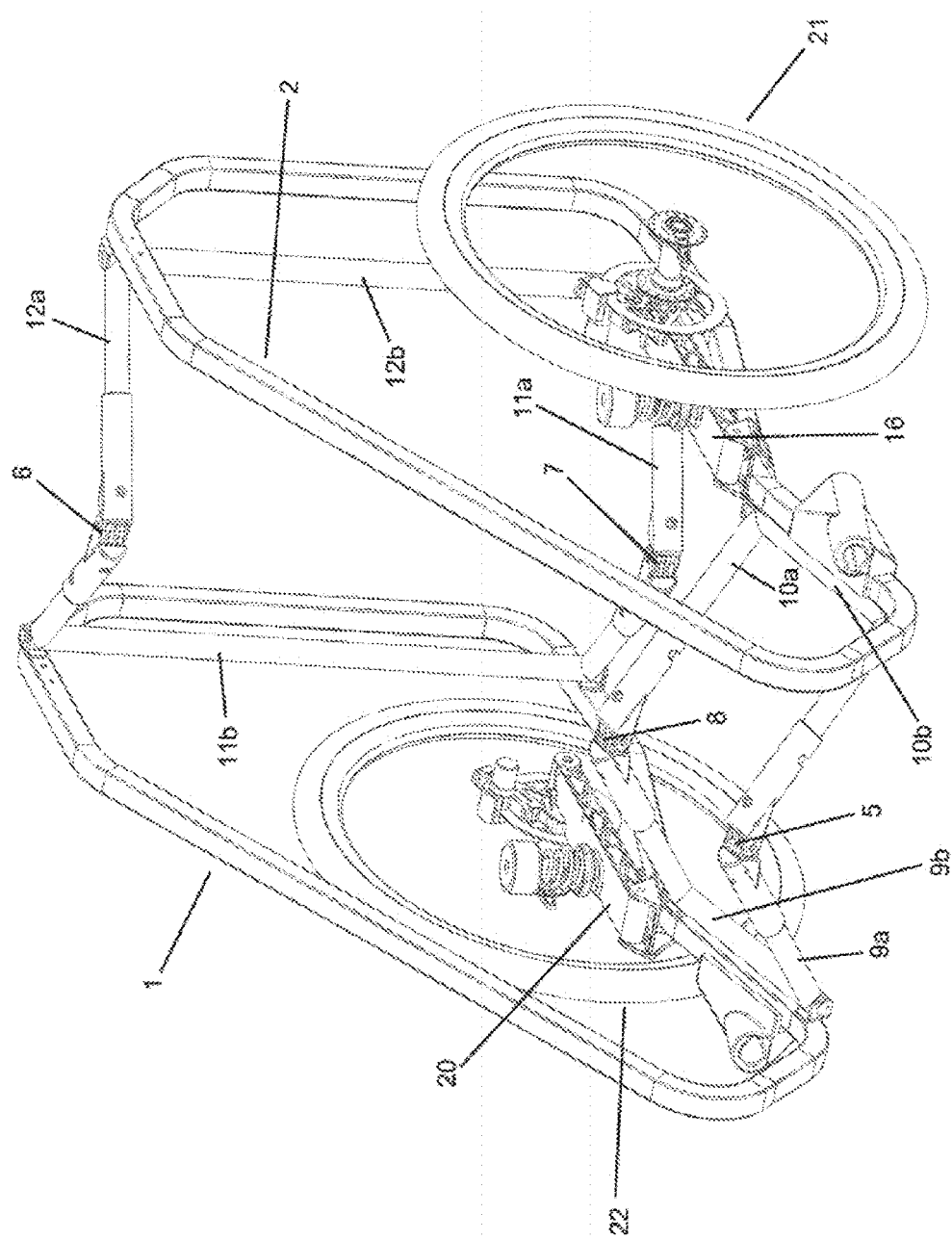
FIG. 9 is a view of a stage when the frame has started to fold, which is a stage next to the one shown in FIG. 8a. It also shows the tow bar and the wheels.
Figure 10:
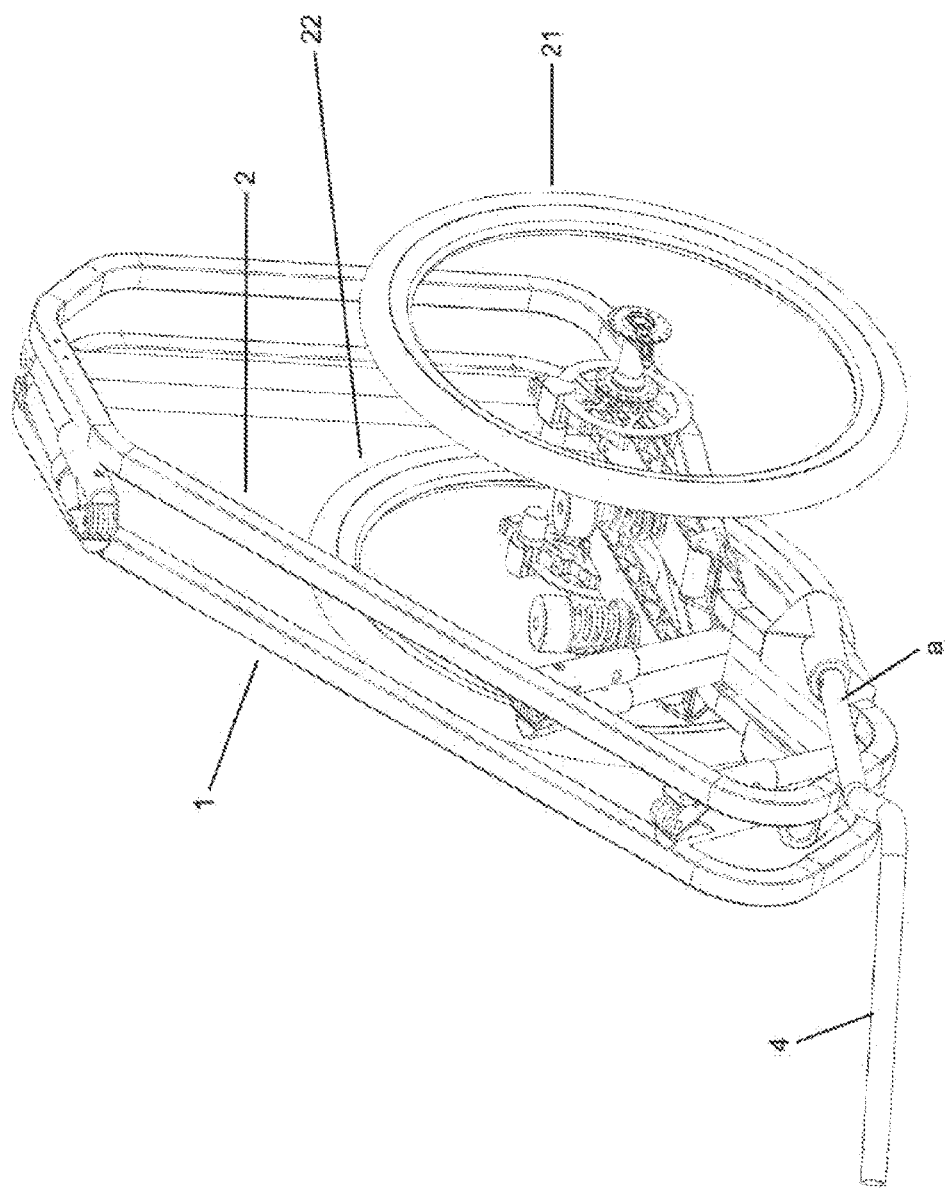
FIG. 10 is a view of the final folded stage. It is a stage just next to the one shown in FIG. 9.
Figure 11:
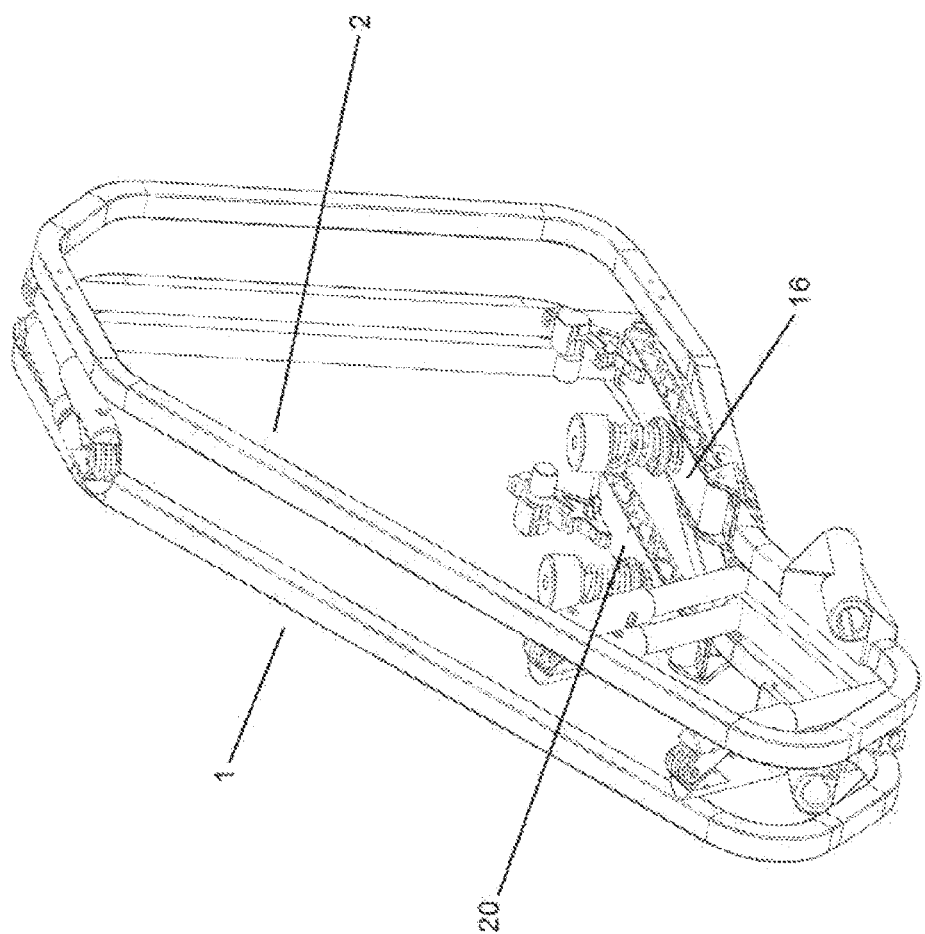
FIG. 11 is a view of the same stage as in FIG. 10, but here the tow bar and wheels are removed for better understanding.

Now referring to FIG. 2 and FIG. 9 (this, other than what is shown in FIG. 2 additionally shows the wheels, and the wheel suspensions), force is applied to the upper part of the frames 1, 2 and the foldable arms 9a, 10a of the first U-shaped element and the foldable arms 11a, 12a of the second U-shaped element start folding. Precisely, the foldable segments of each foldable arm start folding.

It is possible to start the folding operation by applying force at the upper part of the frames because, the foldable arms 9a, 10a of the first U-shaped element and the foldable arms 11a, 12a of the second U-shaped element are disposed at an angle to each other. This is true for unfolding operation as well. It is also possible to apply the force to the bottom of the structure and achieve the same result as hereinbelow described, due to the same reasons.

On continuing to apply the force, the frames 1, 2 are fully folded. This is revealed by FIG. 3, FIG. 10 (this, other than what is shown in FIG. 3, additionally shows the tow bar, wheels, wheel suspensions) and FIG. 11 (this, other than what is shown in FIG. 3, additionally shows the wheel suspensions).

Figure 3:
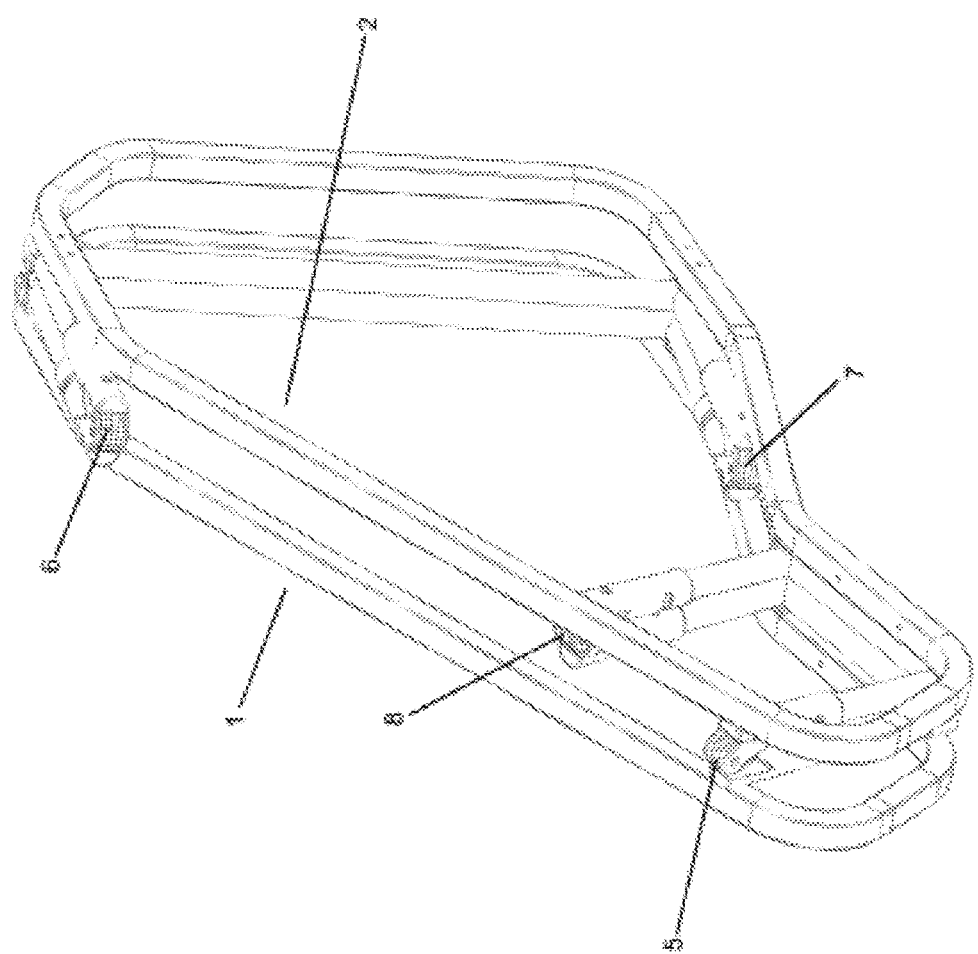
FIG. 3 is view of a final folding stage, which is next to the stage shown in FIG. 2.
Figure 4:
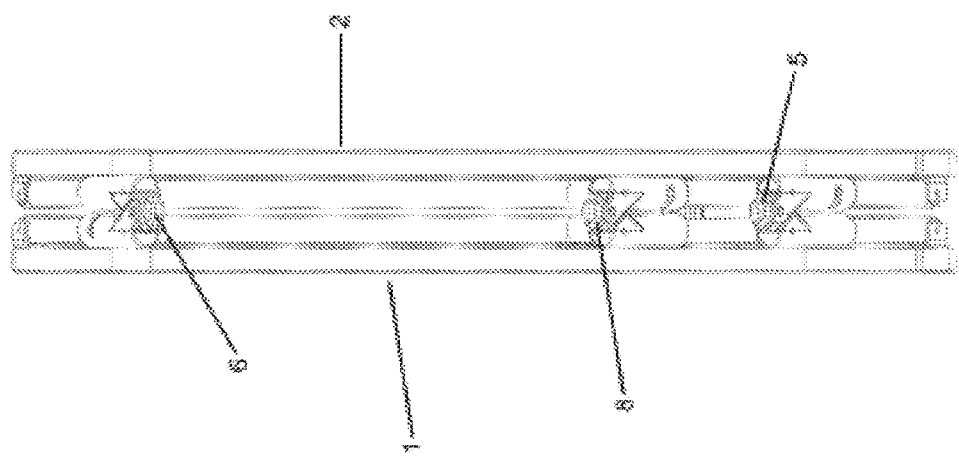
FIG. 4 is a front view of the frames in a folded stage shown in FIG. 3.

FIG. 4, is a front view of the frames in completely folded stage as shown in FIG. 3. It shows that all the hinges 5, 6, 7 (not shown) and 8 are unlocked.

Figure 5:
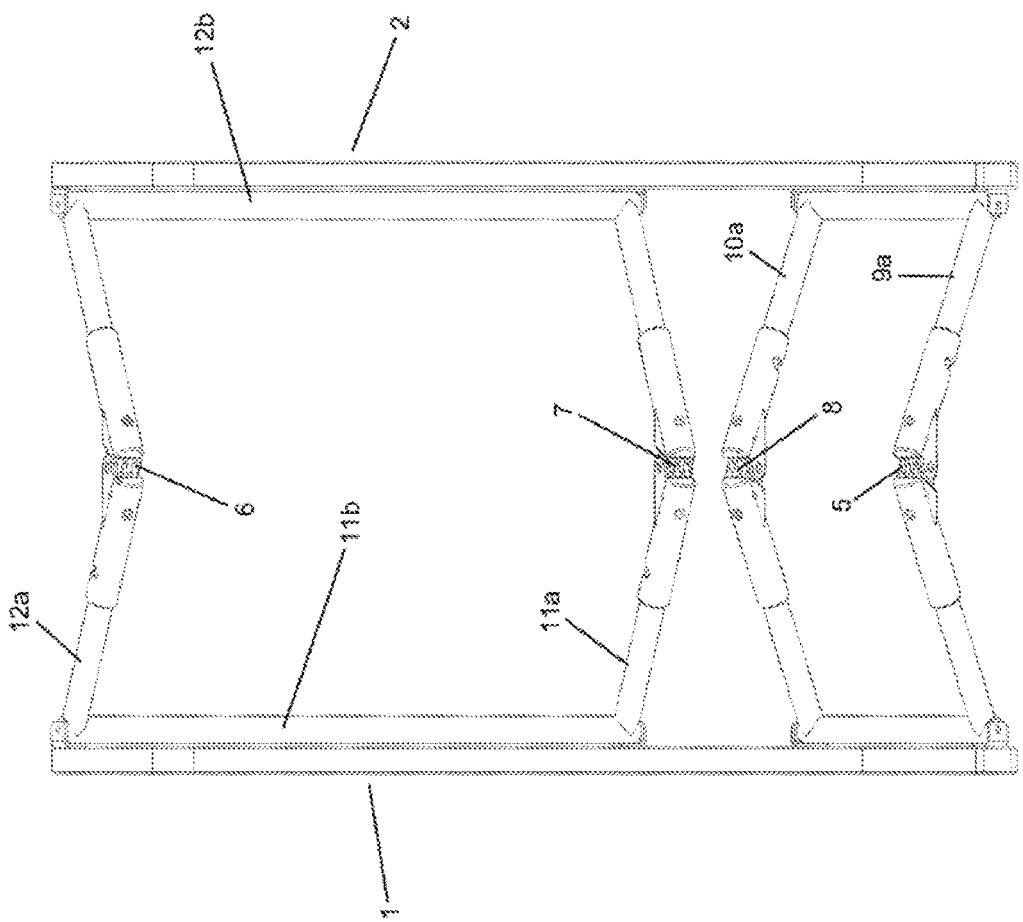
FIG. 5 is a front view of the frame, when it has started to unfold from the stage shown in FIG. 4.
Figure 12:
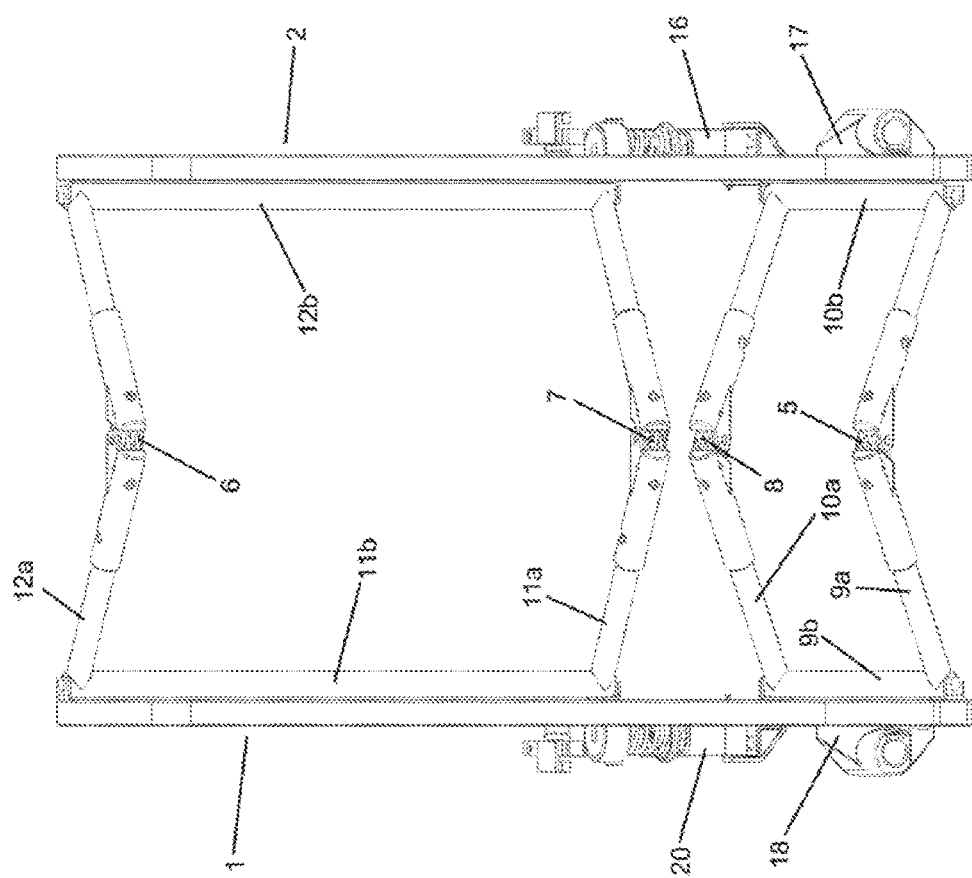
FIG. 12 is a view of the next stage as shown in FIG. 11.

FIG. 5 is a front view of the frames, when it has started to unfold from the stage shown in FIG. 4. Precisely, the foldable segments of each foldable arm have started to unfold. FIG. 12 is an identical view which additionally shows the wheel suspensions 16, 20 and the left-hand bracket attachment 17 and the right-hand bracket attachment 18. It should be clear that this action can also be initiated, just by applying force to the upper part of the frames 1, 2, since the two sets of foldable arms 9a, 10a and 11a, 12a are at disposed at an angle to each other. It is also possible to apply the force to the bottom of the structure and achieve the same result, due to the same reasons. Further, from FIG. 5 all the hinges 5, 6, 7 and 8 are unlocked/released.

Figure 6:
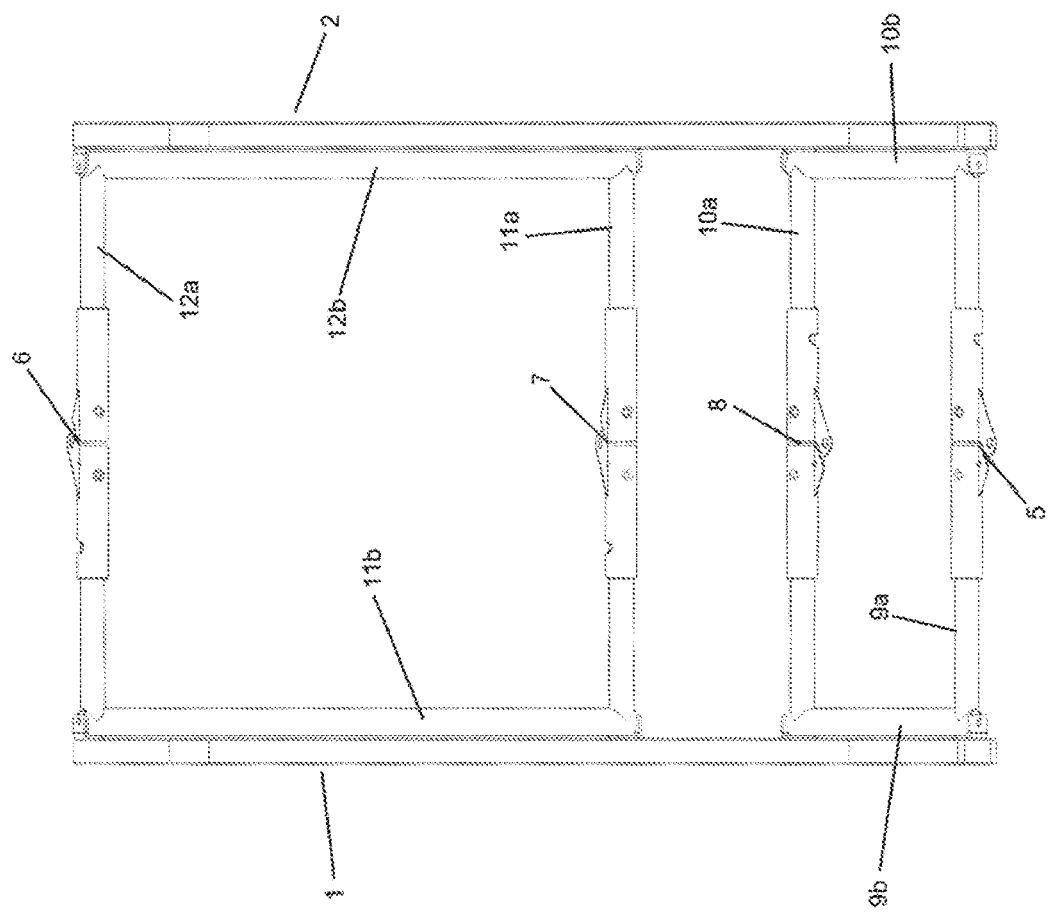
FIG. 6 is a front view of a stage which is final unfolded state of the frame. The lockable hinges are unlocked.
Figure 7:
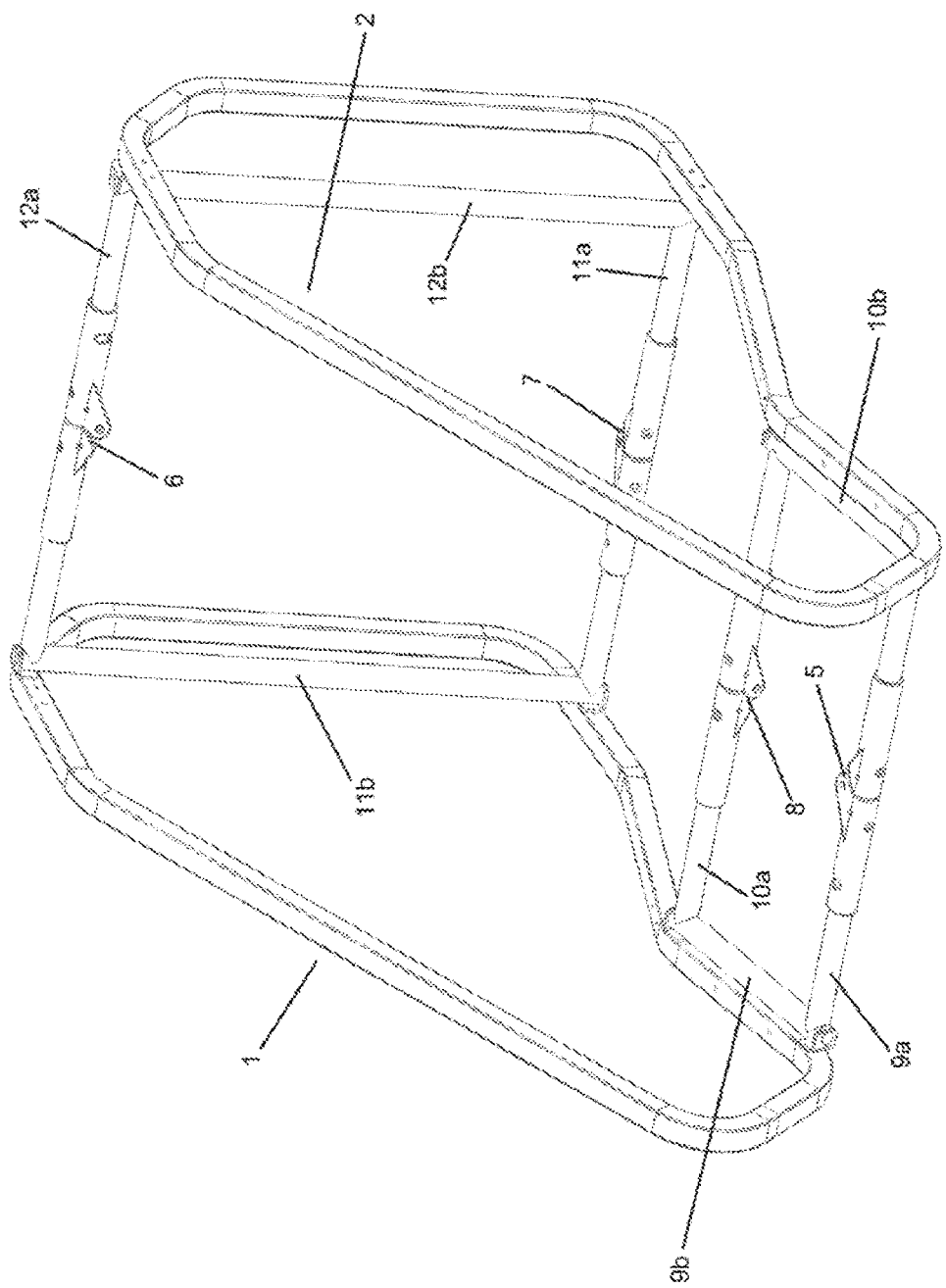
FIG. 7 is a perspective view of the frame in completely unfolded stage, when two of the lockable hinges have been locked.

FIG. 6 is a front view of the next stage which is final unfolded state of the frames, 1,2. The trailer is now again unfolded. FIG. 7 is a perspective view of this stage. Here, for the sake of convenience, the lockable hinges 6, 8 have been locked since the folding and unfolding operation is over. FIG. 8a is a perspective view which is identical to FIG. 7, but here the wheels 21, 22 and wheel suspensions 16, 20 are shown in place. It also shows the tow bar 4 for towing the trailer.

FIG. 13 is an unfolded perspective view of the trailer, which is identical to FIG. 1a, it additionally shows the wheel suspensions 16, 20, the wheels 21, 22 and the left-hand attachment bracket 17 and the right-hand attachment bracket 18.

From the description, drawings and claims it should be clear that the design of the trailer according to the invention ensures, doing away with substantial load on the cross bars, during folding and unfolding operations.

The U-shaped elements can be turned about 90 degrees upwards and forward. All the hinges connecting the foldable segments of the foldable arms, remain unlocked during folding and unfolding operation, so that no human intervention is needed during such operation, for locking/closing or unlocking/releasing any hinges/latches and the like.

Further, folding and unfolding operation can be done keeping the wheels in place, so that in folded stage the trailer can be safely transported in and out of the storage room doors.

In general, the description, drawings and the claims hereinafter reveal that all objectives of the invention are achieved.

The present invention has been described with reference to a preferred embodiment and some drawings for the sake of understanding only and it should be clear to persons skilled in the art that the present invention includes all legitimate modifications within the scope of what has been described hereinbefore and claimed in the appended claims.

The invention claimed is:

1. A foldable bicycle trailer comprising:
   at least two main frames disposed symmetrically about a central plane, which are connected by crossbars and the frames stand on wheels or on any other movable interface on its either side;
   wherein the crossbars comprise a first element which is substantially flat in unfolded state, having at least two parallel foldable arms and a second element which is substantially upright in unfolded stage; and
   at least two parallel foldable arms and in that the foldable arms of each of first and second elements are connected by hinges for connecting the foldable segments of each foldable arm, and that each of the first and second element comprises a U-shaped element and corners of the U-shaped elements are pivotally fastened to the main frames and in that the hinges are positioned at the central part of each of the respective foldable arms.

2. The bicycle trailer as claimed in claim 1 wherein each of the first and second elements comprises a board with a piano hinge along the middle part.

3. The bicycle trailer according to claim 1, wherein the foldable segments of one of the foldable arms of each U-shaped element are connected by lockable hinges and the foldable segments of the other foldable arms of each U-shaped element are connected by unlockable hinges.

4. The bicycle trailer as claimed in claim 1, wherein the first and second elements are connected by hinges and at least one of the connecting hinges between the elements is lockable.

5. The bicycle trailer as claimed in claim 1, wherein the foldable segments of the foldable arms are connected by lockable hinges which can be locked and unlocked manually or remotely.

6. The bicycle trailer according to claim 1, wherein the elements each have a pair of rigid arms in close proximity to the main frames.

7. The bicycle trailer according to claim 1, wherein the foldable arms have the same length.

8. The bicycle trailer according to claim 1, wherein the foldable arms have different lengths.

9. The bicycle trailer according to claim 6, wherein a pair of detachable handles are attached to rigid arms of the second set of elements for using the trailer as a baby buggy or for carrying goods.

10. The bicycle trailer according to claim 1, wherein the interface can accommodate plurality of wheels on either side of the main frames.

11. The bicycle trailer according to claim 1, wherein the interface is adapted to hold larger fastened jogger wheels or attachment of harness/straps for using the trailer as a sleigh/pulk where the wheel area is replaced by skies.

12. The bicycle trailer according to claim 1, wherein a detachable tow bar is attached at a lower lateral portion of one of the main frames for towing by a bicycle or for attachment with another bicycle trailer which is being towed by a bicycle.

13. The bicycle trailer according to claim 1, wherein a pair of detachable and adjustable seats are connected to the main frames structure, such that the seats face forward and can accommodate at least two children therein for using the trailer as a baby buggy, the seats being provided with straps and protective covering for safety of the children.

14. The bicycle trailer according to claim 1, wherein the trailer is usable for carrying goods.

15. The bicycle trailer according to claim 1, wherein the foldable crossbars of the first U-shaped element and the foldable cross bars of the second U-shaped element are disposed at an angle to each other.

16. The bicycle trailer according to claim 1, wherein a pair of wheels are connected on either side of the main frames via suitable suspensions.

* * * * *